Jan. 9, 1934.    F. D. FOWLER    1,942,398
APPARATUS FOR PRODUCING EMBOSSED ARTICLES FROM PLASTIC STRIP MATERIAL
Filed Feb. 20, 1931    5 Sheets-Sheet 5
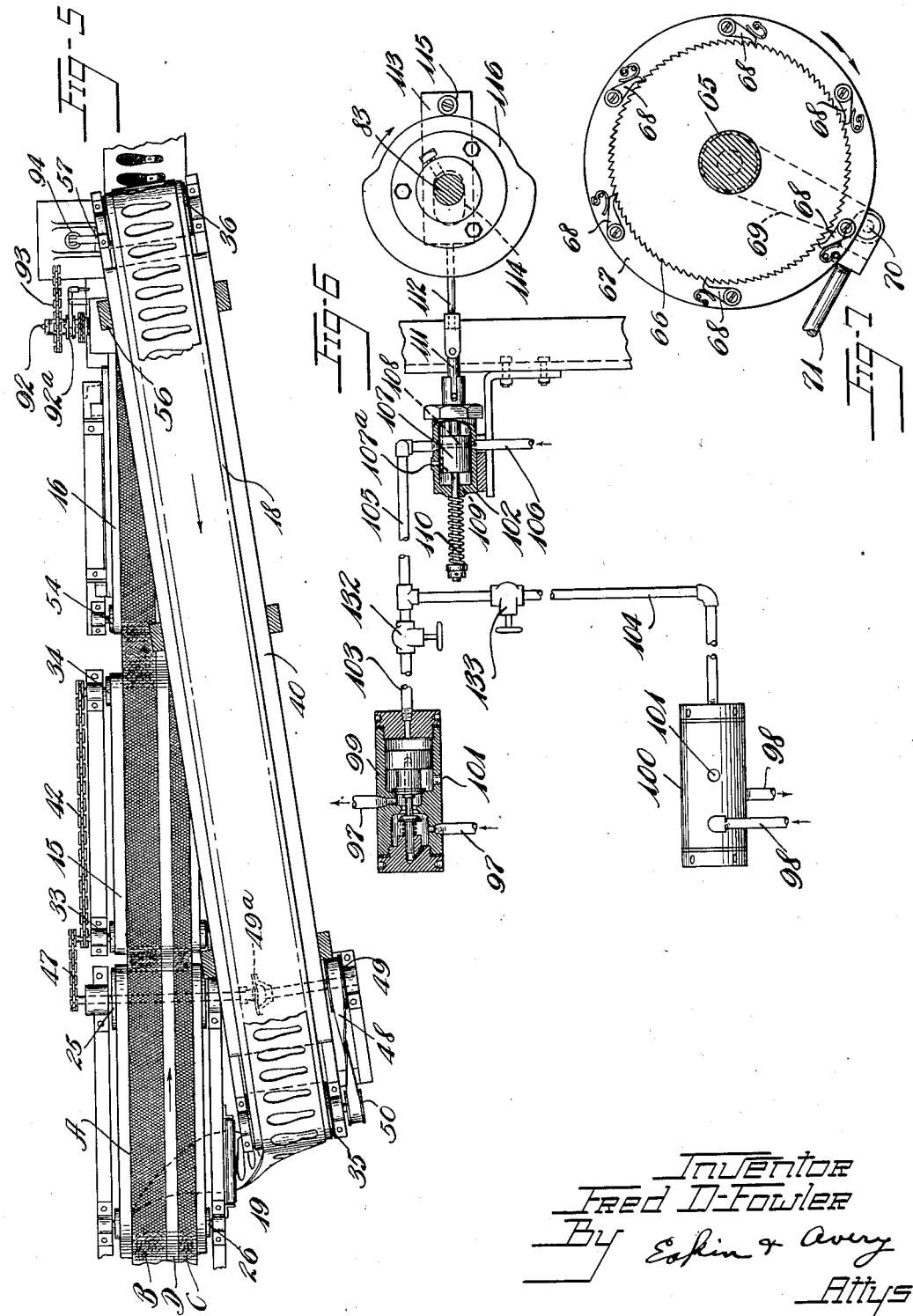
Inventor
Fred D Fowler
By Eskin & Avery
Attys Patented Jan. 9, 1934

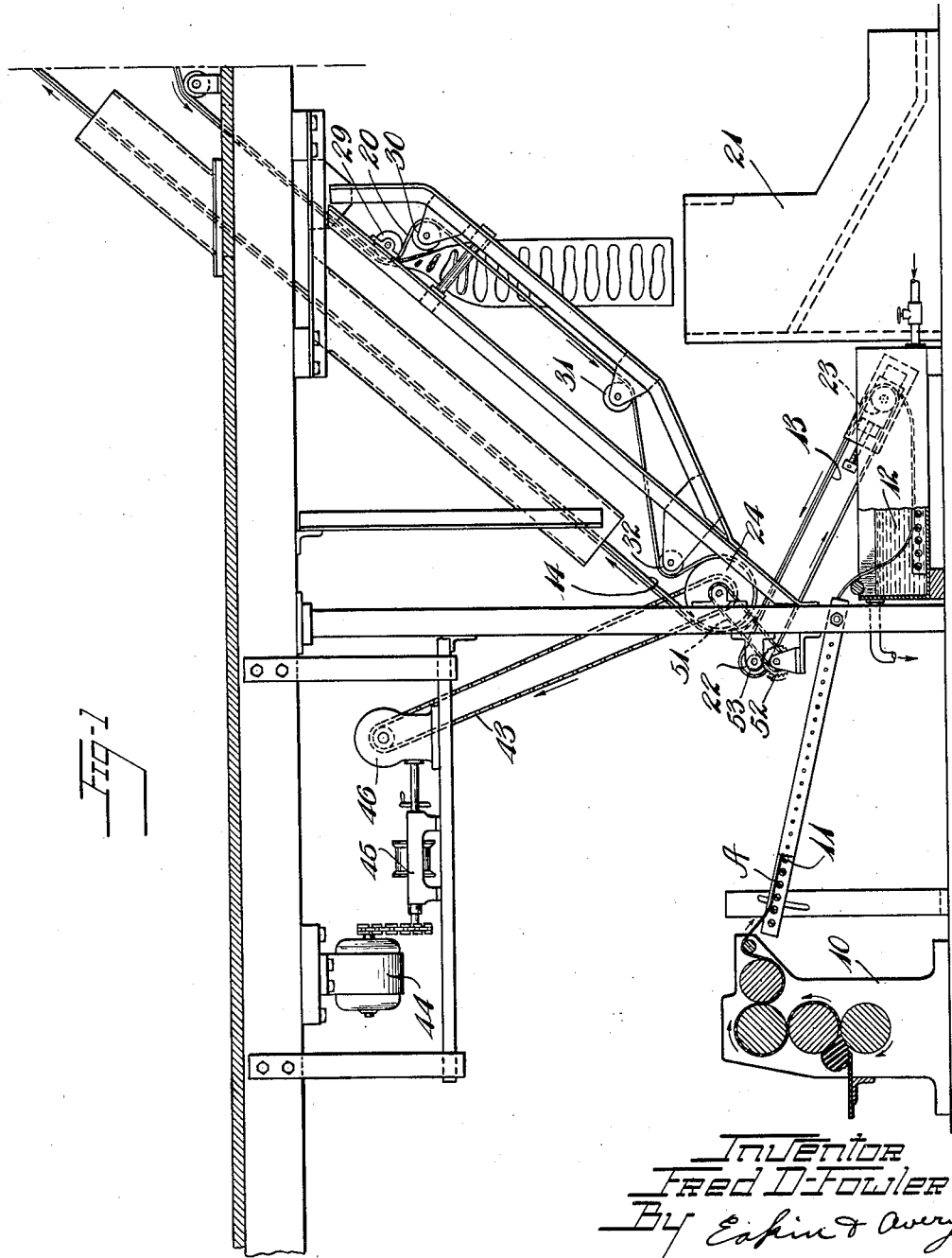

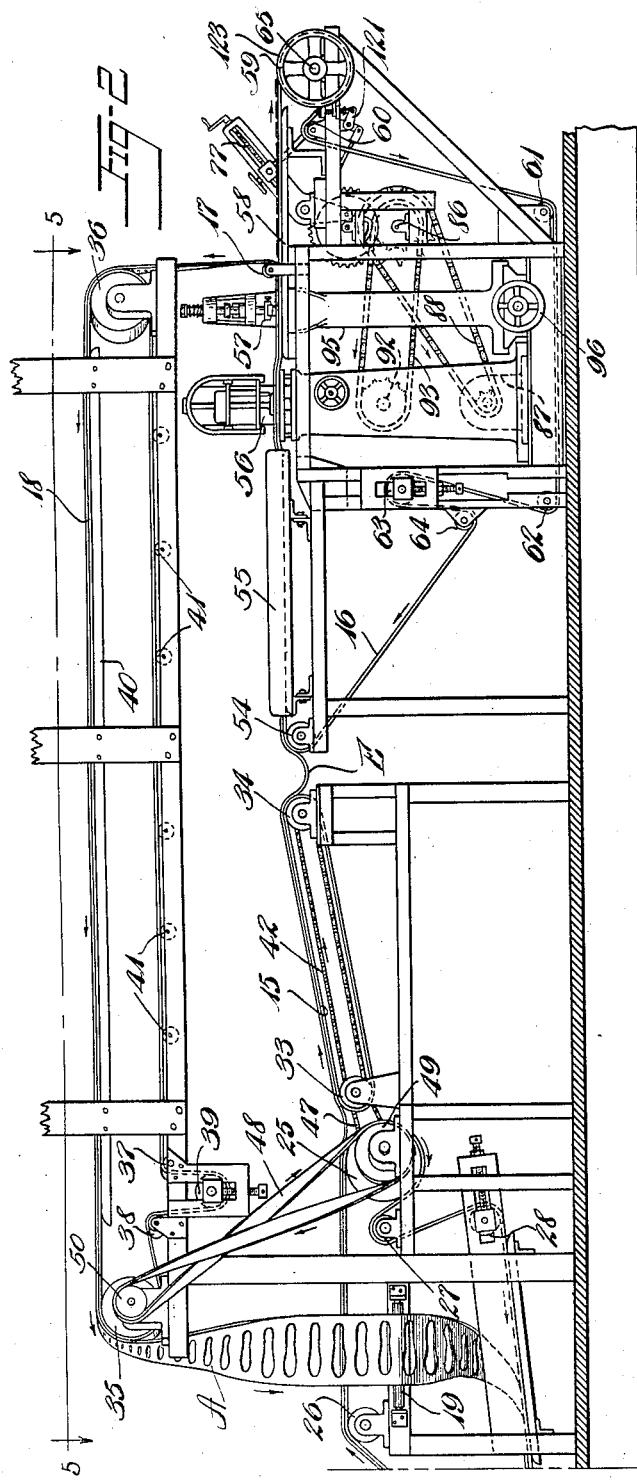

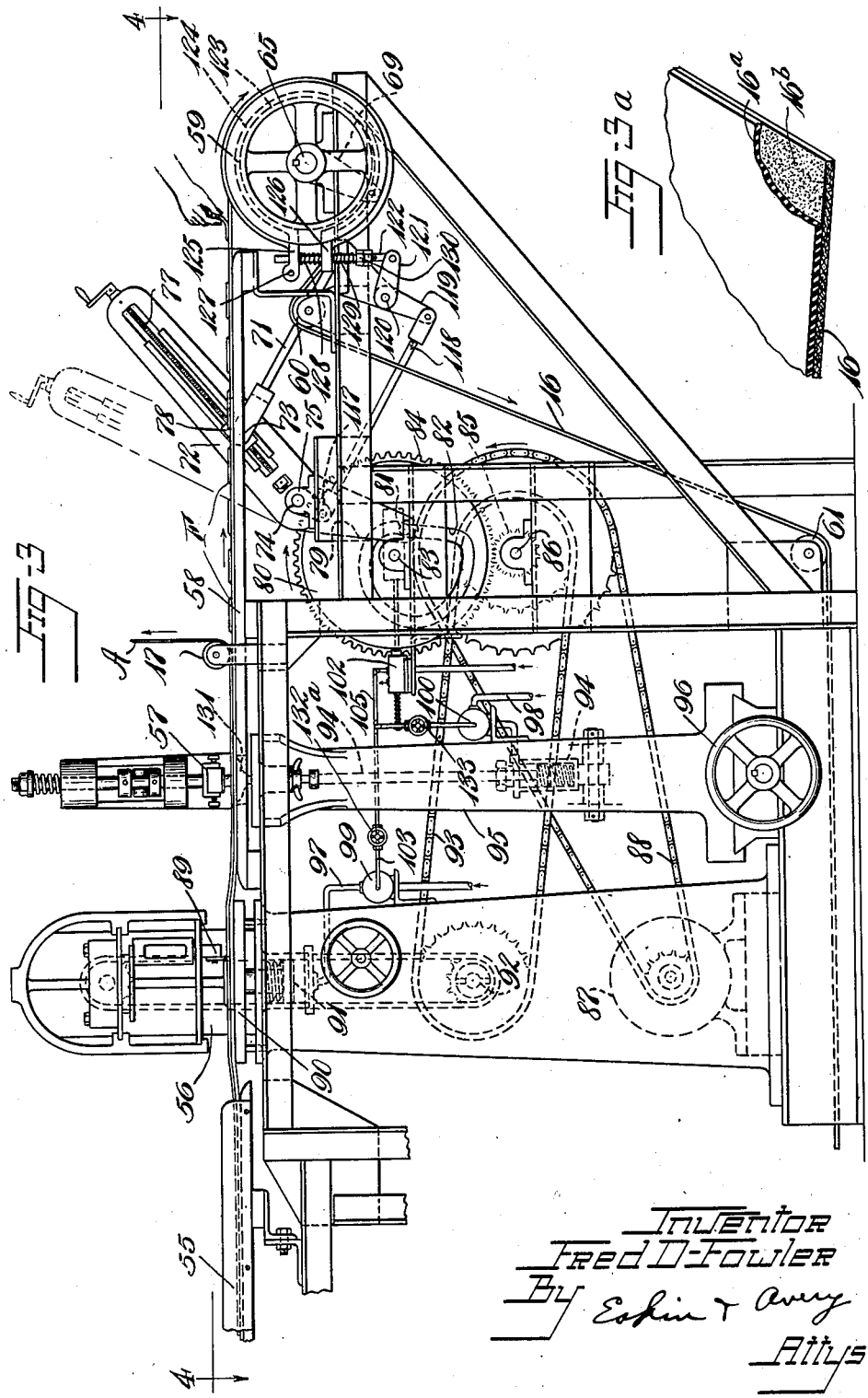

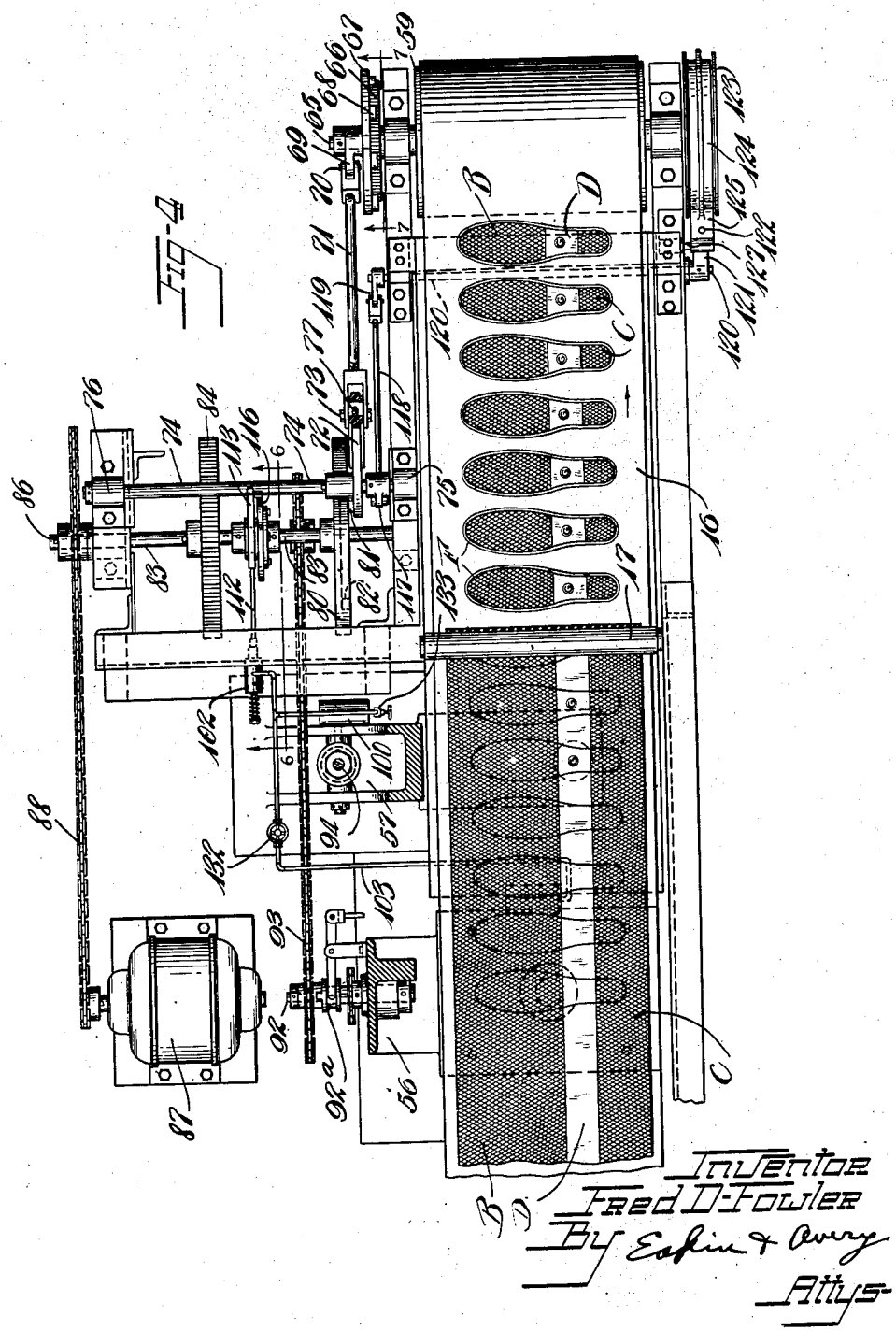

1,942,398

UNITED STATES PATENT OFFICE 1,942,398

APPARATUS FOR PRODUCING EMBOSSED ARTICLES FROM PLASTIC STRIP MATERIAL

Fred D. Fowler, Newton, Mass., assignor to The B. F. Goodrich Company, New York, N. Y., a corporation of New York Application February 20, 1931. Serial No. 517,351

2 Claims. (Cl. 164—22)

This invention relates to apparatus for producing embossed articles from plastic strip material and is especially applicable to the production of such articles as rubber outsoles for shoes by cutting them from strip or sheet stock and providing them with design embossings or brand medallions.

Heretofore, rubber outsoles have commonly been produced by a procedure which involves cutting the soles from sheet stock of comparatively short lengths which have previously been severed from longer strips produced by calendering. In this old procedure the shorter lengths of stock are "booked", i. e., are placed between layers of fabric, and are thus transported to a cutting machine where these lengths are removed from the books and are placed on cutting pads for the cutting operation. Sufficient time is permitted to elapse between the calendering and cutting operation for the stock to shrink and recover to a large extent from strains imparted to the resilient and plastic stock in calendering, so that objectionably distorted or undersized outsoles will not be produced.

By this procedure, however, the amount and uniformity of shrinkage has not always been dependable, due in part to the resistance to shrinkage caused by adhesion of the stock to the fabric of the books and to manual stretching of the stock during the handling incident to removal of the stock from the books. The procedure moreover has been considerably slowed by the many manual operations required in handling the stock and cutting pads, especially in booking the material and in stripping the surplus stock from the cut soles, and a number of helpers have been required to enable the operator of the cutting machine to cut soles with even moderate efficiency.

It is customary to provide an embossing or medallion on the bottom of outsoles at the shanks thereof, and this has heretofore been accomplished by embossing the sheet stock before the sole cutting operation, and usually before the stock leaves the last rolls of the calender. The embossings have been provided at intervals along the sheet stock, the spacing of the embossing being determined by the largest width sole to be cut and consequently making for much waste where soles of smaller sizes are cut from this stock. Also, it has been left to the skill of the operator of the cutting machine to cause the embossing to be located properly on the cut sole. Such inefficiencies as these, especially those incident to the many manual operations with their opportunity for error and waste, the resulting slowness and variations in output, and the undesirably large amount of waste in cutting, are objectionable features of the old procedure which are among the objects of the invention to avoid.

Apparatus has been proposed heretofore for cutting outsoles from rubber stock by automatic operation but such apparatus has in the main been designed with the intent of using strip stock of short length, apparently to avoid the difficulties which are presented in connection with handling plastic strip stock of long length and feeding it to the cutting apparatus, and especially in connection with warm, tacky, plastic, resilient and shrinkable stock as it comes from the calender.

It is an object of the invention to provide apparatus whereby the necessity for severing the sheet stock into comparatively short lengths for the cutting operation is avoided. A more specific object is to provide apparatus whereby outsoles or other articles may be cut directly from stock as it comes from the calender without the necessity of first severing the strip into shorter lengths, and yet provision is made for uniform and adequate shrinkage of the stock prior to cutting. A further object is to provide for cutting articles of various sizes from the stock without interrupting the passage of stock or requiring the calender to be shut down when a change in size is made. Further objects are to eliminate a large amount of unnecessary waste of stock incident to the cutting operation, to cut and emboss outsoles or other articles rapidly and accurately without the full dependence upon the skill of the operator which is necessitated by prior procedure, and to eliminate the manual handling of cutting pads.

The apparatus of the illustrated embodiment of the invention may be conveniently arranged on two adjacent floors of a building, as shown in the drawings in which:

Fig. 1 is a diagrammatic view in side elevation, partly in section, showing apparatus arranged on the lower floor of a building.

Fig. 2 is a diagrammatic view in side elevation of apparatus arranged on the upper floor of the building.

Fig. 3 is an enlarged view in side elevation of a portion of the apparatus illustrated in Fig. 2.

Fig. 3a is a fragmentary view in perspective of the endless apron and cutting pad.

Fig. 4 is a horizontal section on line 4—4 of Fig. 3, parts being shown in plan.

Fig. 5 is a horizontal section on line 5—5 of Fig. 2, parts being shown in plan.

Fig. 6 is an elevation, with parts sectioned and broken away, of portions of the apparatus disposed along the line 6—6 of Fig. 4.

Fig. 7 is a section on line 7—7 of Fig. 4.

Referring to Figs. 1 and 2, a strip of rubber outsole stock A coming from such source as a calender 10, and having its upper surface suitably formed at B, C and D (Fig. 4) to correspond with sole, heel and shank portions, respectively, of the bottoms of outsoles, is fed down a flight 11 of rollers, and into a cooling bath 12 from which it is drawn onto the upper reach of an inclined conveyor belt 13 which carries it up to a position where it is drawn onto the upper reach of a second inclined conveyor belt 14. Conveyor belt 14 raises the strip through an opening to the floor above, and transfers the strip to a third conveyor belt 15 which feeds the strip to a position to be received by an endless padded apron 16 for cutting of outsoles from the strip and for other operations to be explained hereinafter. The remainder of the strip stock, after soles are cut therefrom, is separated from the apron 16 and the cut soles by a stripping roll 17 from which the strip is raised and carried on a return route by an overhead conveyor belt 18. This conveyor belt carries the strip back to the vicinity of the second conveyor belt 14 where the strip is permitted to drop onto the lower return reach of the latter, being guided around the upper reach and one side thereof by virtue of an oblique disposition of the belt 18 (see Fig. 5) and the provision of a deflecting idler roller 19. The lower return reach of the belt 14 carries the strip down through an opening in the floor, and at an offset at 20 in the course of this reach of the belt the strip is dropped into a receiving bin 21 from which the stock may be removed and returned to the calender 10 for reworking or be otherwise disposed of.

Conveyor belt 13 passes over end pulleys 22 and 23 the latter of which is adjustably mounted for regulating the tension of the belt. Belt 14 passes over end pulleys 24 and 25 and course deflecting rollers 26, 27, 28, 29, 30, 31, and 32, all suitably supported. The pivot of roller 28 is adjustably mounted, as shown in Fig. 2, to afford means for adjusting the tension of belt 14. Conveyor belt 15 passes over end pulleys 33 and 34, the latter of which is preferably mounted for limited lateral adjustment to permit the strip stock to be directed for proper alignment on the apron 16.

Belt 15 is of comparatively short span and in lieu of the provision of a tension adjusting device for this belt, both end pulleys are driven together by an interconnecting sprocket chain 42 with suitable sprockets associated with the rollers. Conveyor belt 18 passes over end pulleys 35 and 36, which are mounted on an overhead frame structure, and around idler rollers 37 and 38 and tension adjusting pulley 39. A suitable support 40 is provided for the upper reach of this belt and idler rollers 41 are provided for supporting the lower return reach of the belt.

All the conveyor belts, with the exception of the endless apron 16, are driven continuously, and their drives are interconnected so as to be driven from a common source of power. End pulley 24 of the belt 14 is driven, by means of a sprocket chain 43 and suitable sprockets, from a motor 44 through a speed adjusting device 45 and speed reducing transmission 46, (see Fig. 1). The other end pulley 25 of belt 14 is driven by the conveyor belt, and from this end pulley conveyor belt 15 is driven by means of a sprocket chain 47. Conveyor belt 13 is driven from end pulley 24 through a sprocket chain 51 and gears 52 and 53. Conveyor belt 18 is driven from end pulley 25 by means of a driving belt 48, a pulley 49 connected with the shaft of end pulley 25 through a flexible driving connection 49a (Fig. 5), and a pulley 50 connected with the shaft of end pulley 35. It is desirable to provide means for varying the speed of conveyor belt 18 to accord with the speed of apron 16 which is intermittent and variable, as will be more fully explained hereinafter. For this purpose, pulley 49, which is included in the drive for conveyor belt 18 may be of a friction drive type, capable of slipping under excessive pull, or in lieu thereof a suitable speed regulating device may be associated with the drive for belt 18.

Referring now to Figs. 2, 3 and 4, endless apron 16 passes over an end pulley 54, then over a guide and supporting platform 55, through a sole cutting apparatus indicated at 56, through an embossing apparatus shown at 57, over a supporting platform 58, over an end pulley 59, from whence the apron returns to the first end pulley 54, being directed, however, in its return course, toward the lower portion of the apparatus by a series of idler pulleys 60, 61, 62, 63 and 64 to provide space for operating mechanism. One of the idler pulleys, such as 63 is preferably made adjustable (Fig. 2) for varying the tension of the endless apron.

Apron 16 is moved intermittently, halting at regular intervals in its movement to permit the cutting apparatus 56 to cut soles from the strip stock and to permit the apparatus 57 to emboss cut soles while the apron is stationary, and moving a predetermined distance between the stationary intervals to feed stock to the cutting apparatus and cut soles to the embossing apparatus. The means for driving the apron intermittently includes a pawl and ratchet shown in detail in Fig. 7. End pulley 59 of the apron is keyed to its shaft 65 and to this shaft is secured a ratchet wheel 66. Adjacent the ratchet wheel and freely rotatable on shaft 65 is mounted a pawl disc 67 having a plurality of spring pressed pawls 68, 68 pivoted thereon and arranged to cooperate with the ratchet wheels to feed the latter and with it the end pulley 59 in rotation, in the direction of the arrow Fig. 7, on angular movement in the same direction of the disc 67, and arranged to permit return angular movement of the pawl disc without moving the ratchet wheel or end pulley. Angular movement is imparted to the pawl disc by means of an arm 69, integral with the disc, which arm is pivotally connected at 70 to a connecting rod 71. This rod is actuated by one arm 72 of a bell crank to which it is pivoted at 73. The bell crank is keyed to a shaft 74 which is journalled at 75 and 76 in the supporting frame.

The pivotal connection at 73 is adjustable with relation to the shaft 74 by means of a manually rotatable screw 77 associated with arm 72 and on which is threaded a nut 78 carrying the pivotal connection 73. By adjusting the distance of nut 78 from shaft 74 the throw of rod 71, arm 69, disc 67 and ratchet wheel 66 may be varied, and hence the linear feed of apron adjusted to accord with the width of sole desired to be cut.

The bell crank which includes arm 72 has its other arm, designated 79, projecting downwardly from shaft 74 to cooperate with a driving disc 80. Arm 79 is provided at its lower end with a laterally projecting stud 81 which rides in a cam groove 82 formed in the face of disc 80. This groove is of such shape that during constant rotation of the disc 80, the crank 72 is caused to pause for an interval during each revolution of the disc 80 for the sole cutting and embossing operations, and to move the bell crank and consequently feed the endless apron during the remainder of the revolution of disc 80. This disc is keyed to a shaft 83, which is journalled in the frame work, and is driven through cooperating gears 84 and 85 and through a counter shaft 86 from a motor 87, the counter shaft 86 being connected with the motor by a sprocket chain 88 and cooperating sprocket gears.

The cutting apparatus 56 is of a type having a motor driven cutting mechanism indicated at 89. The cutting mechanism preferably includes a cutter which is rotatable around a sole template and is adapted to cut into the upper surface of the strip stock to cut out soles, the edges of which are bevelled outwardly and downwardly toward the apron. A vertically movable platen 90 is adapted to support the apron 16 and strip stock directly beneath the cutting mechanism, and a fluid pressure mechanism 91 is adapted to raise the platen 90 to bring the strip stock into engagement with the cutting mechanism and to lower the platen to remove the stock from the cutting mechanism to free the strip for feeding. The cutting mechanism is operated by a shaft 92 which is driven from the counter shaft 86 through a sprocket chain 93 and suitable sprockets, and is provided with a manually operable clutch 92a for disengaging the cutting mechanism for a purpose which will appear more fully hereafter. Embossing apparatus 57 is preferably of a fluid pressure operated type and is provided with a fluid pressure operating cylinder 94 adapted to operate the platen 131 of the embossing mechanism through a reciprocable member 94a. The embossing apparatus includes a standard support 95 which is manually adjustable by means of a hand wheel 96 and an associated rack and pinion, or other suitable mechanism, to vary the distance between the cutting and embossing apparatus, longitudinally of the apron, for properly adjusting the embossing mechanism with relation to soles on the apron.

The cutting mechanism 89 is adjusted to cut entirely through the strip stock and in order to protect the apron 16 from the cutter the apron is provided on its outer face with a protective sheet or cutting pad 16a (Fig. 3a) which may be of a rubber and fiber composition, and this cutting pad is preferably so mounted on the apron, as by the use of a suitable cement 16b, that it may be readily replaced after being excessively damaged by the cutter through extensive use.

The fluid pressure cylinders 91 and 94 of the cutting apparatus and embossing apparatus, respectively, are supplied with a fluid such as air through pipes 97 and 98 respectively, and fluid flow to the cylinders is controlled by valves 99 and 100, respectively, in the pipe lines 97 and 98. Each of these valves is of the three-way type (Fig. 6) provided with inlet and outlet passages in connection with the two portions of the pipe line and an exhaust port indicated at 101.

Means is provided for coordinating the operation of the cutting and embossing apparatus with the intermittent drive of the apron so that cutting and embossing will take place while the apron is stationary, and so that the strip stock will be cleared from the cutting and embossing mechanism for feeding. The valves 99 and 100 of the fluid supply pipes 97 and 98 are operated by an auxiliary fluid pressure system under the control of a master valve 102. Pipe lines 103 and 104 join with a common conduit 105 to conduct fluid from valve 102 to the valves 99 and 100 to act upon the valve pistons of the latter. Master valve 102 is connected with a source of fluid supply 106 and is provided with an exhaust port 107a. A valve piston 107 is adapted to reciprocate within the casing of the valve and this plunger is formed with a transverse passage 108 adapted to place pipes 106 and 105 in communication in the position of the plunger shown in Fig. 6.

On movement of the plunger to the right as seen in this figure, the plunger is adapted to close the supply 106 and by means of a passage 109 in the plunger to place the pipe 105 in communication with exhaust port 107a. The plunger is provided with an extension rod 110 which is spring pressed as shown to urge the plunger to the left as seen in Fig. 6. A rod 111 secured to the other end of the plunger passes through a gland packing in the valve casing and is connected by means of a rigid connection 112 with a member 113 which is mounted for reciprocation transversely to shaft 83 by means of an elongated slot 114 formed in the member and through which shaft 83 passes. A cam roller 115 projects laterally from the member 113 and cooperates with the surface of a cam 116 which is mounted on and rotates with shaft 83. Cam 116 is of such shape that as it rotates it will act upon roller 115 of member 113 to reciprocate the latter to operate the piston 107 of master valve 102 controlling the operation of the cutting and embossing apparatus. The arrangement is such that the cutting and embossing apparatus is operated through control valve 102 and cam 116 in timed relation with the intermittent feeding of apron 16 through the constantly rotating shaft 83, which as it will be remembered, also carries cam disc 80 for operating the apron feeding mechanism.

A manually operable stop valve 132 is provided in pipe line 103 by which the supply of control fluid to valve 99 may be cut off to render the platen 90 of the cutting apparatus inoperative when it is desired to replace the cutting template and adjust the cutter for changing the size of sole to be cut. By this provision, together with the provision of the manually operable clutch 92a in the drive of the cutting mechanism, previously described, it will be seen that the cutting apparatus may be disabled for adjustment without necessitating stoppage of other mechanism and without affecting the steady travel of stock from the calender by interruption or stoppage which would be likely to cause such damage as scorching of the stock in the heated rolls of the calender or other objectionable change in the condition of the stock. With the cutting mechanism disengaged, the uncut stock is drawn onto the overhead conveyor 18 and returned as scrap. A stop valve 133 (Figs. 3 and 5) may be provided in pipe line 104 leading to control valve 100 for independently rendering the embossing apparatus inoperative as for the purpose of adjustment or repair.

In order that the apron 16 may be fed rapidly and yet be stopped to position the strip stock and soles accurately for each cutting and embossing operation without overrunning, means is provided for braking end pulley 59 of the apron toward the end of each feeding movement, and also for releasing the pulley and apron for each feeding movement. Shaft 74, which carries the feeding bell crank arm 72 and 79, has keyed thereto another arm 117 (Figs. 3 and 4) to which is pivoted a rod 118 which is pivotally connected at its other end to an arm 119 carried by a shaft 120. This shaft is journalled in the supporting frame and extends across the same. At its other end is carries another arm 121 which is pivoted at its extremity to an operating rod 122 of the brake mechanism. The latter comprises a brake drum 123 and a brake band 124 which is formed with two projecting ends 125 and 126 the first of which is pivoted at 127 to the supporting frame and the latter of which is floating and is adapted to be moved toward the end 125 to cause the brake band to exert pressure against the surface of the brake drum. These ends are apertured to receive rod 122 passing through them as shown, and a coil spring 128 surrounding the rod is interposed between the ends of the brake band to urge them resiliently apart. Another coil spring 129, surrounding rod 122, is interposed between the floating end 126 of the brake band and a backing nut 130 mounted on the rod 122 to transmit braking pressure resiliently from the rod to the brake band in opposition to the lesser force of spring 128.

In operation, strip stock A in a warm, plastic condition passes from the calender 10 (Fig. 1) onto the flight of rolls 11 which is preferably set at such an angle that the strip stock requires a certain amount of pushing from the stock behind in order to descend the flight. This pushing or crowding serves to assist the freshly calendered stock in shrinking to recover from strains imparted to it in calendering. The major portion of such shrinkage has been found to occur during the first half minute or so after the stock leaves the calender, and this time interval is permitted to elapse while the stock is crowded down the flight of rollers 11 in order that adequate shrinkage of the stock may be facilitated. The stock then dips into the cooling bath 12 where shrinkage is checked and the stock temporarily loses enough of its plasticity to be lifted from the bath onto the first conveyer belt 13. The strip is then carried over the series of conveyer belts, previously described, to the endless apron 16 (Fig. 2), the speeds of these conveyor belts being suitably adjusted, preferably in progressively decreasing relation, to permit further slight adjustments of the stock under residual shrinkage strains, without undesirable warping or distortion of the stock. The last conveyor belt 15 is spaced from the endless apron 16 and the speeds of the conveyor belt are so adjusted with relation to the apron 16 that a small festoon E (Fig. 2) is permitted to form in the strip stock sufficient to compensate for the change in the movement from the continuous feed of the conveyor belts to the intermittent feed of the apron.

Assuming the parts to be in the positions indicated in Fig. 3, it will be seen that the apparatus is shortly to begin a feeding movement. As cam disc 80 rotates in the direction of the arrow in Fig. 3 away from the position shown, arm 79 of the bell crank is caused to turn counter-clockwise about shaft 74 as seen in this figure by engagement of cam roller 81 in cam groove 82, and arm 72 of the bell crank is also turned counter-clockwise to the broken line position indicated in the figure. This throw of arm 72 causes partial rotation of end pulley and a corresponding feed of the apron through the movement of connecting rod 71, pawl disc 67 and ratchet wheel 66, as before explained. The amount of rotative feed of end pulley 59 is determined by the distance between shaft 74 and manually adjustable position of pivotal connection 73 on arm 72. During this feeding movement arm 117 turns counter-clockwise with shaft 74 to move rod 122 of the brake mechanism through link 118, arm 119, shaft 120, and arm 121 to compress spring 129 and apply progressively increasing gripping pressure through brake band 124 to the surface of drum 123. The apron will thus be brought to a stop in a position presenting the apron and fresh stock of the strip in alignment with the cutting mechanism and with a previously cut sole in alignment with the embossing mechanism, the embossing apparatus having been previously adjusted by means of hand wheel 96 to center the embossing die with the shank portion of the sole. When the apron is stopped cam groove 82 of disc 80 causes return movement of arms 72, 79 and 117 of the shaft 74 and consequent return of pawl disc 67 to its original position and also release of the braking mechanism.

During the time the apron is stopped, cam 116 on constantly rotating shaft 83 cooperates with cam roller 115 of reciprocable member 113 to permit plunger 107 of the master valve 102 to be moved to the left (Fig. 6) by the pressure of the spring associated with extension rod 110 and to occupy the position indicated in Fig. 6. Passage 106 of piston 107 then admits fluid from supply pipe 106 to pipes 105, 103 and 104, and thus to valves 99 and 100. These valves are thereupon opened and operating fluid is caused to flow through pipes 97 and 98 to cylinders 91 and 94 of the cutting apparatus and embossing apparatus, respectively, whereupon platens 90 and 131 will be raised against the bottom surface of the apron to bring the stock into engagement with the cutting mechanism and a cut sole into engagement with the embossing die. The form of cam 116 permits the platens to press the apron and stock upwardly for a time sufficient for the cutting and embossing operations, when this cam operates to move plunger 107 of the master valve 102 to the right as seen in Fig. 6 and to cause actuation of valves 99 and 100 to exhaust fluid from cylinders 91 and 94. The platens are thereby caused to descend and free the apron and stock from the cutting and embossing apparatus, whereupon a cycle of operation is complete and the apparatus is in readiness to begin the next cycle.

The length of each feeding movement may be adjusted by means of screw 77 of arm 72 to accord with the width of soles to be cut in order to keep the amount of waste material between soles as low as possible, consistent with efficient cutting. It will be seen, moreover, that the apparatus may be speedily and conveniently readjusted, and without affecting the steady flow of stock from the calender, for a change in size of sole to be cut, in order to cut the new size soles with minimum waste of stock between soles and to center the embossings accurately on the shanks of the soles.

As the cycles of feeding, cutting and embossing continue, the waste stock is stripped from the cut soles at the stripping roll 17 and the waste is drawn onto conveyor 18 to be returned to the lower floor. As previously explained, the speed of continuously moving conveyor 18 may be regulated, this being for the purpose of accommodating its speed to the feed of apron 16 and to variations in the stretchability of the strip stock caused by variations in the size of the perforations formed in the stock by sole cutting. The stripping operation is facilitated by the tendency of the cut soles to adhere to the cutting pad of the apron and also by the outward and downward bevel F (Fig. 4) of the cut soles which permits the surrounding stock to be lifted readily from the apron without disturbing the cut soles. The cut and embossed soles may be removed manually from the apron, as indicated in Fig. 3, and be disposed of as desired.

Variations are possible and I do not desire the scope of the following claims to be limited wholly by the illustrated embodiment of the invention.

What I claim is:

1. Apparatus of the class described comprising, in combination, a backing for plastic sheet material, means operable in cooperation with said backing for severing a portion of the material from an adjacent portion while both portions retain their positions on the backing, and means for stripping one of the portions from the backing and from the other portion of the material.

2. Apparatus of the class described comprising, in combination, a backing for plastic strip material, means for cutting articles individually from the material, means for providing embossings on the same, means for progressively moving the backing to a material cutting position and to an embossing position spaced from the first said position, power means for operating said cutting, embossing and moving means in timed relation, and means for stripping excess material from the articles and backing.

FRED D. FOWLER.